United States Patent
Villalon, Jr.

(10) Patent No.: US 11,649,524 B2
(45) Date of Patent: May 16, 2023

(54) NOBLE METAL EXTRACTION METHOD AND APPARATUS

(71) Applicant: Phoenix Tailings Inc., Woburn, MA (US)

(72) Inventor: Thomas Anthony Villalon, Jr., Cambridge, MA (US)

(73) Assignee: Phoenix Tailings Inc., Woburn, MA (US)

(*) Notice: Subject to any disclaimer, the term of this patent is extended or adjusted under 35 U.S.C. 154(b) by 0 days.

(21) Appl. No.: 17/657,392

(22) Filed: Mar. 31, 2022

(65) Prior Publication Data

US 2022/0349023 A1 Nov. 3, 2022

Related U.S. Application Data

(60) Provisional application No. 63/183,163, filed on May 3, 2021.

(51) Int. Cl.
| | | |
|---|---|---|
| C22B 11/00 | (2006.01) | |
| C22B 3/06 | (2006.01) | |
| C22B 3/22 | (2006.01) | |

(52) U.S. Cl.
CPC ............ C22B 11/042 (2013.01); C22B 3/06 (2013.01); C22B 3/22 (2013.01)

(58) Field of Classification Search
CPC ......... C22B 11/04–048; C22B 3/06–10; C22B 3/22; C22B 34/20; C22B 34/30
USPC ........................................................ 423/22
See application file for complete search history.

(56) References Cited

U.S. PATENT DOCUMENTS

| | | | |
|---|---|---|---|
| 7,682,420 B2 | 3/2010 | Abe et al. | |
| 8,585,991 B2 | 11/2013 | Dreisinger et al. | |
| 2007/0014709 A1 | 1/2007 | Moyes et al. | |
| 2016/0362804 A1 | 12/2016 | Chen et al. | |
| 2017/0114429 A1* | 4/2017 | Britton | C22B 3/20 |

FOREIGN PATENT DOCUMENTS

| | | | |
|---|---|---|---|
| CN | 102051478 A | | 5/2011 |
| CN | 111172398 A | | 5/2020 |
| JP | 5542378 B2 | | 7/2014 |
| WO | WO 2006/013568 | * | 2/2006 |

OTHER PUBLICATIONS

P. Trucillo et al., "Selective Leaching of Precious Metals from Electrical and Electronic Equipment through Hydrometallurgical Methods", Chemical Engineering Transactions, vol. 86, 2021, See International Search.
International Search Report Corresponding to PCT/US2022/022782 dated Jun. 13, 2022.
Written Opinion Corresponding to PCT/US2022/022782 dated Jun. 13, 2022.
Ding Yunji et al., "Recovery of precious metals from electronic waste and spent catalysts: A review", Elsevier, Resources, Conservation & Recycling, vol. 141, 2019, pp. 284-298.
Kim Min-Seuk et al., "Dissolution behaviour of platinum by electrogenerated chlorine in hydrochloric acid solution", J Chem Technol Biotechnol, 2013 Society of Chemical Industry, Feb. 11, 2013, vol. 88, pp. 1212-1219.
Mipinga C.N. et al., "Direct leach approaches to Platinum Group Metal (PGM) ores and concentrates: A review", Elserier, Minerals Engineering, 2015, vol. 78, pp. 93-113.
Seisko Sipi, "Electrochemical studies of gold dissolution in cupric and ferric chloride solutions", Aalto University Doctoral Dissertations, Department of Chemical and Metallurgical Engineering, Mar. 13, 2020, 76 pages.
Torres Robinson et al., "Platinum, palladium and gold leaching frommagnetite ore, with concentrated chloride solutions and ozone", Elsevier, Hydrometallurgy, http://dx.doi.org/10.1016/j.hydromet.2016.06.009, 2016, 10 pages.
Wang Zhike et al., "Application of ferric chloride both as oxidant and complexant to enhance the dissolution of metallic copper", Elsevier, Hydrometallurgy, 2010, vol. 105, pp. 69-74.

* cited by examiner

*Primary Examiner* — Steven J Bos
(74) *Attorney, Agent, or Firm* — Finch & Maloney PLLC

(57) ABSTRACT

A method for extracting noble metals from mining tailings and other solids is provided. The method uses a Lewis acid, Brønsted acid, complexing agent and oxygen to provide excellent extraction without the need for chorine gas or cyanide.

30 Claims, 1 Drawing Sheet

Add Lewis acid and Bronsted acid to distilled water to obtain pH 0
Oxygen gas sparged into the system
Tailings added to solution to produce a slurry
Tailings are agitated at atmospheric pressure and 50°C for 1 hr
Tailings separate from extraction solution
Complexed noble metals converted to metallic form ing agent can be a salt that includes the same anion as does the Brønsted acid, e.g., chloride. The resulting soluble noble metal complex can be, for example, $A_x[MZ_y]$ where A is an alkali metal cation, M is a noble metal and Z is a halide. A

NOBLE METAL EXTRACTION METHOD AND APPARATUS

BACKGROUND

1. Field of the Disclosure

The present disclosure relates to methods for the extraction of trace metals and, more specifically, to the extraction of valuable metals from mining tailings, ore bodies, scrap materials, and recycled materials.

2. Discussion of Related Art

Valuable metals such as palladium, platinum and gold may be present in trace amounts in waste materials in the form of tightly bound complexes. Methods for extracting these valuable metals typically include the use of toxic reagents such as cyanide or chlorine gas.

SUMMARY

In one aspect, a method of separating bound metals from a solid is provided, the method comprising mixing a solid comprising at least one metal (M) into an aqueous solution having a pH of less than 3.0 to form a slurry or mixture, the solution comprising a Brønsted acid and a complexing agent, contacting the slurry or mixture with an oxidant having a redox potential of greater than or equal to 0.958 V, producing a soluble complex of the at least one metal (M) in the slurry, and recovering at least 10% by weight of the at least one metal (M) from the solid. The aqueous solution can include a Lewis acid comprising a salt such as a metal halide salt. The salt can comprise iron, chromium, manganese or copper. The Lewis acid can comprise an alkali metal cation and the complexing agent can comprise the same alkali metal cation, which can be, for example, potassium or sodium.

The metal can be at least one of palladium, platinum, gold, iridium, osmium, rhodium, molybdenum, niobium, silver or ruthenium. The Brønsted acid can be a mineral acid and can include the same anion as does the Lewis acid and/or the complexing agent. The solution pH during mixing can be less than 2.5, less than 2.0, less than 1.5, less than 1.0 or less than 0.5. In some embodiments the bound metals are in the form of base metal sulfides, sulfates, phosphides, phosphates, carbonates, tellurides or arsenides. The temperature of the aqueous solution can less than 110° C., less than 100° C. or less than 90° C. and can be greater than 40° C., 50° C. or 60° C. In some embodiments the method comprises a batch process and the ratio of the solid to the aqueous solution is, by weight, greater than 1:10, greater than 1:8, greater than 1:5, greater than 1:4 greater than 1:3, greater than 1:2, greater than 1:1, greater than 2:1, greater than 3:1, greater than 5:1 or greater than 10:1. The ratio of the solid to the aqueous solution can be, by weight, less than 1:1, less than 1:2, less than 1:3, less than 1:5 or less than 1:10. The slurry or mixture can be mixed for greater than 1 minute, greater than 5 minutes, greater than 10 minutes, greater than 30 minutes or greater than 1 hour. In various embodiments the Lewis acid is present in the slurry at a concentration of greater than 0.1 M, 0.2 M or 0.25 M. The complexing agent can be present in the slurry at a concentration of greater than 0.05 M, greater than 0.1 M or greater than 0.2 M. The oxidant can exhibit a positive redox potential of greater than 0.958 V, 1.0 V, 1.1 V or 1.2 V. The process can be void of gaseous oxidants other than oxygen and can be void of chlorine gas. In some cases, the method is void of gaseous oxidants except for oxygen, air and/or ozone. The method can include the addition of a second oxidant that can be selected from perchlorate, persulfate, peroxide, hypochlorite, hypobromite, hypoiodite, chlorite, bromite, iodite, chlorate, bromate and iodate. The solid can be pentlandite, chalcopyrite and/or pyrite. In alternative embodiments, the solid can be mining tailings, dilute ore bodies, scrap material or material for recycling. These methods can include a reduced species of the Lewis acid. The oxidant can comprise peroxide, perchlorate or ozone and can be a gas such as air, oxygen or ozone. In other embodiments the oxidant is dissolved in the solution and can be, for example, perchlorate, peroxide, persulfate or ozone.

BRIEF DESCRIPTION OF THE DRAWINGS

The figures are not intended to be drawn to scale. In the figures, each identical or nearly identical component that is illustrated in various figures is represented by a like numeral. For purposes of clarity, not every component may be labeled in every figure.

FIG. 1 provides a flow chart of one embodiment of a process for extracting noble metals from tailings.

DETAILED DESCRIPTION

The processes and materials described herein can provide for the safe, efficient extraction of valuable metals from media that are historically difficult to recover precious metals from. In various embodiments, the processes use a unique pairing of reagents that results in extraction of metals and even noble metals at standard reaction temperatures in the absence of traditionally employed strong oxidants such as gaseous chlorine and cyanides.

Although the processes can be effective for recovering a wide variety of metals, the greatest value may be achieved extracting noble metals from difficult substrates. As used herein, and as is accepted in the art, noble metals include the platinum group metals (PGM) ruthenium (Ru), rhodium (Rh), palladium (Pd), osmium (Os), iridium (Ir) and platinum (Pt), as well as gold (Au) and silver (Ag). The noble metals exhibit low reactivity and as a result can be difficult to force into solution. While the processes herein can be applied to a variety of matrices including dilute ore bodies, scrap material and material for recycling, mining tailings are a particular target, and the bulk of the description herein is directed to mining tailings. In particular, the processes are effective at extracting metals, such as noble metals, that are bound in the matrix as base metal sulfides, sulfates, phosphides, phosphates, carbonates, tellurides or arsenides.

Target base metal sulfides can be present in pentlandite, chalcopyrite and/or pyrite.

In one set of embodiments, the extraction medium comprises, consists of, or consists essentially of:
 a. an aqueous Brønsted acid solution;
 b. a complexing agent;
 c. a Lewis acid; and
 d. an oxidant.

The process can include a reduced species of the Lewis acid that, in the presence of an oxidant, provides a thermodynamically balanced source of the Lewis acid as it is reduced during the metal extraction process. The complexing agent can be a salt that includes the same anion as does the Brønsted acid, e.g., chloride. The resulting soluble noble metal complex can be, for example, $A_x[MZ_y]$ where A is an alkali metal cation, M is a noble metal and Z is a halide. A specific complex in the case of platinum is sodium hexachloroplatinate ($Na_2[PtCl_6]$). Analogous complexes for other noble metals include $Na_2PdCl_6$, $Na_2RhCl_5$, $NaAuCl_4$ and $Na_2AgCl_3$.

FIG. 1 provides a flow chart for one embodiment of the process. The solution is first prepared by adding the desired amount of Lewis acid to distilled water and then adding enough Brønsted acid to reduce the pH to 0. An oxygen sparger is then activated to provide gaseous oxygen to the aqueous phase. The tailings are then added to the solution, typically at a wt/wt ratio of 10:1 to 1:1. The slurry is heated to, for example, 50° C., and is agitated to keep the solids moving within the slurry. After 1 hr the tailings are separated by allowing them to settle out. The liquid phase is then decanted off, and any noble metals that are present can be recovered and converted to metallic form.

One embodiment of the process can be represented by the following two equations that can occur simultaneously to provide an adequate concentration of Lewis acid to keep the process thermodynamically favorable:

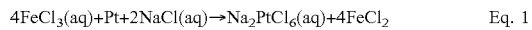

$$4FeCl_3(aq)+Pt+2NaCl(aq) \rightarrow Na_2PtCl_6(aq)+4FeCl_2 \qquad Eq.\ 1$$

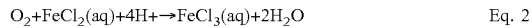

$$O_2+FeCl_2(aq)+4H+ \rightarrow FeCl_3(aq)+2H_2O \qquad Eq.\ 2$$

In this example, ferric chloride is the Lewis acid, sodium chloride is the complexing agent, sodium hexachloroplatinate is the noble metal complex, ferrous chloride is the reduced species of the Lewis acid, oxygen serves as a gaseous oxidant, and hydronium ions are provided by the Brønsted acid (HCL). The resulting solution can be filtered or otherwise separated from any solids and the noble metal can be isolated by, for example, converting the metal to an ammonium salt and thermally decomposing the salt to provide zero valence metal.

The Lewis acid can be any electron pair acceptor. In the embodiments described herein, the Lewis acid is soluble in acidic aqueous solutions and can be a soluble salt. In some cases, the Lewis acid can be a halide salt that includes an alkali metal cation and in specific cases can be a trivalent ionic compound. The reduced species of the Lewis acid is a chemical species that can be recycled into the Lewis acid via oxidation. For instance, in the case where the Lewis acid is a trivalent salt the reduced species can be a divalent salt comprising the same halide and metal. In various embodiments the Lewis acid can be present in concentrations of greater than 0.01 M, greater than 0.05 M, greater than 0.1 M, greater than 0.2 M, greater than 0.3 M or greater than 0.4 M.

The Brønsted acid is capable of donating a proton and can be, for example, a strong mineral acid such HCl, HBr, $HNO_3$, $HClO_4$ and $H_2SO_4$. The Brønsted acid can provide protons for maintaining the concentration of the Lewis acid as it is consumed. The pH of the solution can be, for example, less than 3.0, less than 2.5, less than 2.0, less than 1.5, less than 1.0 or less than 0.5. In the same and other embodiments, the pH can be greater than −1.5, greater than −1.0, greater than −0.5 or greater than 0. The Brønsted acid in the extraction solution can be at a concentration of, for example, greater than 1.0 M, greater than 2.0 M, greater than 5.0 M, greater than 7.5 M or greater than 10.0 M.

The complexing agent can be a soluble species that provides a cation for forming the soluble complex of the noble metal. The complexing agent can be a salt that in some cases comprises the same anion as the Lewis acid, the Brønsted acid, or the same as both. In different embodiments, the cation can be single or multivalent. In specific examples the cation is an alkali metal cation and can be, for example, sodium or potassium. In various embodiments, the complexing agent is used at concentrations of greater than 0.001 M, greater than 0.05 M, greater than 0.1 M or greater than 0.2 M. In the same and other embodiments, the complexing agent can be less than 1.0 M or less than 0.5 M.

In many cases, the oxidant can be a species that is capable of maintaining an adequate concentration of the Lewis acid as it is reduced to produce the soluble noble metal complex. The oxidant can have a positive redox potential of, for example, greater than 0.64 V, greater than 0.77 V, greater than 0.958 V, greater than 1.0 V or greater than 1.2 V. The oxidant can be dissolved in the solution/slurry or provided as a gas and can be, for example, oxygen or air. In additional embodiments the oxidant can include ozone, hydrogen peroxide, or alkali metal perchlorate salts. The oxidant can be void (essentially free) of materials such as chlorine gas that require specific safety precautions due to hazards to health and the environment. In different embodiments the oxidant can be provided in bubbles that have an average diameter of less than 1 mm, less than 1 micron or less than 1 nanometer. Equipment for providing the gaseous oxidant includes spargers that may be resistant to acidic environments and can produce bubbles of the preferred size. In specific examples, the oxidant, for example air, can be provided at rates (per liter of liquid) of greater than 100 mL/min, greater than 500 mL/min, greater than 1.0 L/min, less than 5.0 L/min or less than 2.0 L/min. In other embodiments, the oxidant can be provided at rates of greater than 0.01 mols/L/min, greater than 0.05 mols/L/min or greater than 0.1 mols/L/min. Additional oxidants can also be used in the solution. These include, for example, hypochlorite, hypobromite, hypoiodite, chlorite, bromite, iodite, chlorate, bromate, iodate, perchlorate, persulfate and peroxides such as hydrogen peroxide.

The processes can be used to extract metals from a variety of solids that contain trace to moderate amounts of the target metal. The matrix containing the bound noble metal(s) can be a solid, for example, tailings from mining operations, recycled materials such as catalytic converters as well as printed circuit boards and other computer parts. Extraction efficiency can be improved with a higher surface area to volume ratio, and therefore commutation of the materials often precedes chemical extraction. Mining tailings include, for example, tailings from copper, iron and precious metal mining operations. Tailings may be low particle size solids having an average particle diameter of less than 1 mm, less than 500 µm, less than 250 µm, less than 100 µm or less than 50 µm. The tailings may contain very low concentrations of noble metals, for example, less than 100 g/MT, less than 50 g/MT or less than 10 g/MT. At these concentrations and others, the processes described herein can be capable of recovering greater than 10%, greater than 20%, greater than 30%, greater than 40%, greater than 50%, greater than 60%, greater than 70%, greater than 80% or greater than 90% of the noble metals present in the tailings. Other recycled and waste materials can possess greater concentrations of target metals, for example, greater than 100 g/MT, greater than 1 kg/MT or greater than 10 kg/MT, and recovery percentages are the same or similar.

In many embodiments, the process is operated at above ambient temperature, for example in a range of 50° C. to 110° C. In other embodiments, the temperature can be, for example, greater than 40° C., greater than 50° C., greater than 60° C., less than 120° C., less than 80° C. or less than 70° C. The process can be performed at atmospheric pressure or pressurized to less than 3 atmospheres of pressure. The tailings can be agitated in the acidic solution during extraction, such as by mixing with a stirring paddle. Oxidant addition can take place before and during the extraction procedure. The time for reaction can be selected depending on how efficiently the metals are being removed from a specific matrix and the desired level of completeness of the extraction. For instance, the time of extraction can be, for example, greater than 10 minutes, greater than 15 minutes, greater than 30 minutes, greater than 1 hour, greater than 3 hours or greater than 6 hours.

Although the examples described herein are batch processes, the same chemistry can be applied to a continuous process such as a fluid bed. In a continuous process, for example, the extraction solution can be counter flowed to the direction of the movement of the tailings, resulting in an increasing concentration of noble metals in the solution and a decreasing concentration of noble metals in the tailings.

Example 1

This example describes the removal and recovery of platinum (the target metal) from tailings using an aqueous solution comprising sodium chloride, ferric chloride, distilled water, 12 molar hydrochloric acid, and sparged oxygen.

An aqueous mixture composed of 15.8 grams sodium chloride, 116.8 grams ferric chloride, 600 milliliters distilled water, and 300 milliliters of 12 molar hydrochloric acid was heated to 60° C. over a period of 1 hour, sparged with air at a rate of 400 milliliters per minute, and mixed thoroughly with mechanical agitation. Afterwards, 300 grams of platinum tailings were added, mixed for 30 minutes, and the liquids were separated from the solids. The liquid decant was then evaporated to a solid state. High platinum recovery was obtained in the solids.

Example 2

This example describes the removal and recovery of platinum (the target metal) from tailings using an aqueous solution comprising sodium chloride, ferric chloride, distilled water, 12 molar hydrochloric acid, and 35% hydrogen peroxide.

An aqueous mixture composed of 15.8 grams sodium chloride, 116.8 grams ferric chloride, 600 milliliters distilled water, and 300 milliliters of 12 molar hydrochloric acid was heated to 60° C. over a period of 1 hour and mixed thoroughly with mechanical agitation. Afterwards, 300 grams of platinum tailings were added to the solution. The hydrogen peroxide was added in intervals of 10 milliliters every ten minutes for a total of 30 milliliters. The solution was mixed for 30 minutes, and the liquids were separated from the solids. The liquid decant was then evaporated to a solid state. High platinum recovery was obtained in the solids.

Example 3

This example describes the removal and recovery of platinum (the target metal) from tailings using an aqueous solution comprising sodium chloride, ferric chloride, distilled water, 12 molar hydrochloric acid, and sodium chlorate.

An aqueous mixture composed of 15.8 grams sodium chloride, 116.8 grams ferric chloride, 600 milliliters distilled water, and 300 milliliters of 12 molar hydrochloric acid was heated to 60° C. over a period of 1 hour, sparged with air at a rate of 400 milliliters per minute, and mixed thoroughly with mechanical agitation. Afterwards, 300 grams of platinum tailings and 31.6 grams of sodium chlorate were added, mixed for 30 minutes, and the liquids were separated from the solids. The liquid decant was then evaporated to a solid state. High platinum recovery was obtained in the solids.

Example 4

A solution of 500 mL distilled water, 9.2 mL of 12 M hydrochloric acid, 10.1 grams of iron (Ill) chloride, 2.7 grams of sodium chlorate, and 32.2 grams of calcium hypochlorite were mixed together and heated to 95° C. After reaching and staying at 95° C. for 15 minutes, 500 grams of synthetic tailings with 90 wt % silica, 10 wt % alumina, and 0.1 grams of platinum (iv) sulfide was added and mixed for 4 hours. High platinum recovery was obtained.

Example 5

A solution of 50 mL distilled water, 0.9 mL of 12 M hydrochloric acid, 1.0 gram of iron (Ill) chloride, 0.3 grams of sodium chlorate, and 3.2 grams of calcium hypochlorite were mixed together and heated to 95° C. After reaching and staying at 95° C. for 15 minutes, 0.2 grams of platinum (iv) arsenide was added and mixed for 4 hours. High platinum recovery was obtained.

Example 6

A solution of 500 mL distilled water, 9.2 mL of 12 M hydrochloric acid, 10.1 grams of iron (Ill) chloride, 2.7 grams of sodium chlorate, and 32.2 grams of calcium hypochlorite were mixed together and heated to 95° C. After reaching and staying at 95° C. for 15 minutes, 500 grams of PGM tailings with a grade of approximately 0.2 grams per ton of platinum was added and mixed for 4 hours. High platinum recovery was obtained.

While several embodiments have been described and illustrated herein, those of ordinary skill in the art readily will envision a variety of other means and/or structures for performing the functions and/or obtaining the results and/or one or more of the advantages described herein, and each of such variations and/or modifications is deemed to be within the scope of the present invention. More generally, those skilled in the art readily will appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain, using no more than routine experimentation, many equivalents to the specific embodiments of the invention described herein. Therefore, it is to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The invention claimed is:

1. A method of separating bound noble metals from a solid, the method comprising:
   mixing a solid comprising at least one noble metal (M) into an aqueous solution having a pH of less than 3.0 to form a slurry, the solution comprising a Brønsted acid, a Lewis acid, and a complexing agent;
   contacting the slurry with an oxidant having a redox potential of greater than or equal to +0.77 V;
   producing a soluble complex of the at least one noble metal (M) in the slurry; and
   recovering at least 10% by weight of the at least one noble metal (M) from the solid.

2. The method of claim 1 wherein the Lewis acid comprises a salt.

3. The method of claim 2 wherein the Lewis acid comprises a metal halide salt.

4. The method of claim 3 wherein the metal of the metal halide salt is selected from iron, chromium, manganese and copper.

5. The method of claim 1 wherein the Lewis acid comprises an alkali metal cation and the complexing agent comprises the same alkali metal cation.

6. The method of claim 5 wherein the alkali metal cation is potassium or sodium.

7. The method of claim 1 wherein M is at least one of the platinum group metals.

8. The method of claim 1 wherein the Brønsted acid is a mineral acid.

9. The method of claim 1 wherein the Brønsted acid includes the same anion as does the Lewis acid and/or the complexing agent.

10. The method of claim 1 wherein the pH of the aqueous solution during mixing is less than 2.5.

11. The method of claim 1 wherein the bound noble metals are base metal sulfides, sulfates, phosphides, phosphates, carbonates, tellurides, arsenides or a mixture thereof.

12. The method of claim 1 wherein the temperature of the aqueous solution is less than 110° C.

13. The method of claim 1 wherein the temperature of the aqueous solution is greater than 40° C.

14. The method of claim 1 wherein the method comprises a batch process and the ratio of the solid to the aqueous solution is, by weight, greater than 1:10.

15. The method of claim 1 wherein the method comprises a batch process and the ratio of the solid to the aqueous solution is, by weight, less than 1:10.

16. The method of claim 1 wherein the slurry is mixed for greater than 1 minute.

17. The method of claim 1 wherein the Lewis acid is present in the slurry at a concentration of greater than 0.05 M.

18. The method of claim 1 wherein the complexing agent is present in the slurry at a concentration of greater than 0.001 M.

19. The method of claim 1 wherein the oxidant exhibits a positive redox potential of greater than +0.958 V.

20. The method of claim 1 wherein the method is void of gaseous oxidants other than oxygen.

21. The method of claim 1 wherein the method is void of chlorine gas.

22. The method of claim 1 wherein the solid comprises pentlandite, chalcopyrite and/or pyrite.

23. The method of claim 1 wherein the solid comprises mining tailings, dilute ore bodies, scrap material or material for recycling.

24. The method of claim 1 wherein the solution comprises a reduced species of the Lewis acid.

25. The method of claim 1 wherein the oxidant comprises peroxide, perchlorate or ozone.

26. The method of claim 1 wherein the oxidant is a gas.

27. The method of claim 26 wherein the gas comprises air, oxygen or ozone.

28. The method of claim 1 wherein the oxidant is dissolved in the solution.

29. The method of claim 28 wherein the oxidant comprises perchlorate, peroxide, persulfate or ozone.

30. The method of claim 1 wherein the method is void of gaseous oxidants except for oxygen, air and/or ozone.

* * * * *